United States Patent [19]

Dammann et al.

[11] Patent Number: 5,450,195
[45] Date of Patent: Sep. 12, 1995

[54] PHASE-MODULATED INTERFEROMETER FOR EVALUATING PHASE DISPLACEMENT RESULTING FROM CHARGES IN PATH LENGTH

[75] Inventors: Ehrhard Dammann; Juergen Bauer, both of Jena, Germany

[73] Assignee: Jenoptik GmbH, Jena, Germany

[21] Appl. No.: 201,645

[22] Filed: Feb. 25, 1994

[30] Foreign Application Priority Data

Mar. 5, 1993 [DE] Germany .................. 43 06 884.7

[51] Int. Cl.$^6$ ............................................. G01B 9/02
[52] U.S. Cl. ......................................... 356/345; 356/358
[58] Field of Search ............... 356/358, 363, 357, 345; 385/12, 14

[56] References Cited

U.S. PATENT DOCUMENTS

| | | | |
|---|---|---|---|
| 2,385,086 | 9/1945 | D'Agostino et al. | 356/345 |
| 4,422,764 | 12/1983 | Eastman | 356/357 |
| 4,941,744 | 7/1990 | Yokokura et al. | 356/358 |
| 4,966,459 | 10/1990 | Monchalin | 356/358 |
| 5,141,315 | 8/1992 | Malvern | 356/345 |
| 5,212,825 | 5/1993 | Layton | 356/345 |
| 5,298,970 | 3/1994 | Takamatsu et al. | 356/349 |
| 5,319,438 | 6/1994 | Kiasaleh | 356/345 |

*Primary Examiner*—Samuel A. Turner
*Assistant Examiner*—Jason D. Eisenberg
*Attorney, Agent, or Firm*—McAulay Fisher Nissen Goldberg & Kiel

[57] ABSTRACT

A phase-modulated interferometer with novel control and signal processing utilizes superimposition signals capable of evaluation in a phase-modulated interferometer without complicated control of the phase modulator. A sinusoidal control signal with a modulation frequency ($\omega_0$) having an amplitude ($\psi_0$) is supplied to a known phase modulator. Multiplicative mixing of the superimposition signal produced in the interferometer from the measuring and reference arm with a sinusoidal signal of a determined mixing frequency ($\omega_M$) which is rigidly coupled with respect to phase and frequency with the control signal is effected. When the amplitude ($\psi_0$) of the control signal satisfies the condition for a suitable operating point of the phase modulator, a cosine signal conventionally used for evaluating the phase displacement is filtered out in an electronic bandpass filter at whose filter frequency ($\omega_F$) the sum and difference frequencies of two harmonics of the modulation frequency ($\omega_0$) and the mixing frequency ($\omega_M$) assume the same value. The invention is applied in phase-modulated interferometers, in particular for precision distance measuring devices, preferably by the heterodyne evaluating method.

13 Claims, 4 Drawing Sheets

PHASE-MODULATED INTERFEROMETER FOR EVALUATING PHASE DISPLACEMENT RESULTING FROM CHARGES IN PATH LENGTH

BACKGROUND OF THE INVENTION a) Field of the Invention

The present invention is directed to a phase-modulated interferometer for evaluating phase displacements due to changes in optical path lengths in the measuring arm of the interferometer. It is used in particular for precision distance measuring systems which preferably make use of the heterodyne method for evaluating.

b) Background Art

Precision distance measuring systems based on interferometers have been known since lasers were first introduced. There is a basic distinction between homodyne and heterodyne evaluating methods. Heterodyne methods are generally preferred due to the possibility of counting forward and backward and the high interpolation due to the disappearing direct light component. At present, exclusively single-sideband detection is used for evaluation. Zeemann splitting or Bragg deflection are used for generating a sideband or for spatially separating the sidebands. In integrated-optical heterodyne interferometers, a frequency modulation or phase modulation can also be effected in addition to the splitting and recombination of the beam. For reasons of stability and the difficulty of forming single-mode strip waveguides on layer waveguides, and vice versa, with the aid of tapers, lenses or grids, interferometers with continuous strip waveguides are desirable. However, this excludes the acousto-optical Bragg deflection for spatial separation of the sidebands. A phase modulation can be realized in the strip waveguide on the basis of the electro-optical effect. A sideband suppression can be achieved with a precisely defined electrical controlling of the modulator. For example, in IEEE Journ. Quant. Electr. QE-18 (1982), pages 124–129, Voges et al. describe a defined electrical control of the modulator by sawtooth pulses with defined flyback and accordingly achieve a sideband suppression of 40 dB. However, production of such control signals is complex and requires very high expense in providing regulating means.

OBJECT AND SUMMARY OF THE INVENTION

A primary object of the present invention is the realization of a phase-modulated interferometer which achieves superposition [beating or heterodyning] signals capable of evaluation from the measuring and reference arm of the interferometer without complicated control of the phase modulator.

In a phase-modulated interferometer with a measuring arm and a reference arm in which a phase modulator is arranged in one of the two arms of the interferometer for phase modulation of the optical radiation and in which there is a detector for picking up an optical superimposition signal from the measuring and reference arm, evaluating electronics being arranged subsequent to the detector for determining the phase displacement of the signal, the primary object is met, according to the invention, in that a sinusoidal control signal with a determined modulation frequency and amplitude is applied to the phase modulator, in that a device for multiplicative mixing of the superposition signal with a sine signal with suitable mixing frequency is arranged in the signal path of the superposition signal, this sine signal being rigidly coupled with respect to phase and frequency with the control signal, in that a bandpass filter is connected subsequent to the detector, its filter frequency being formed by the agreement of the sum frequency and difference frequency of the modulation frequency or its harmonic waves and the mixing frequency at $$\omega_F = (2m-1)\omega_0 + \omega_M = 2n\omega_0 - \omega_M,$$

where $m, n = 1, 2, 3, \ldots$ and $m \leq n$, so that suitable selection of an operating point affected by the amplitude of the control signal at the output of the bandpass filter results in a signal having the following form $$S = \text{const.} \cos(\omega_F t - kx),$$

which signal is evaluated with conventional methods for determining the phase displacement, where t designates time, k designates wave number, and x designates the distance to be measured.

Such device for multiplicative mixing of the superimposition signal with a sine signal can be designed in, for example, two variations. The device is preferably a multiplier which is arranged subsequent to the detector, the sine signal being applied to its second input at the appropriate mixing frequency.

A second possibility for realizing the multiplicative mixing is advantageously provided by using a second phase modulator which lies in the signal path of the optical superimposition signal prior to the detector and is supplied with a control signal at the suitable mixing frequency.

In both variations, the known first phase modulator is adjusted in such a way that the amplitude of the control signal satisfies the equation $$J_{2m-1}(2\psi_0) = J_{2n}(2\psi_0),$$

ps where $m, n = 1, 2, 3, \ldots$ and $J_i$ is the i-th Bessel function.

An advantageous design possibility of the interferometer according to the invention consists in its use in a three-arm interferometer, e.g., to compensate for the wavelength drifts, in which two reference arms are provided. The two reference arms generate two separately evaluated superimposition signals with the same measuring arm in that the second phase modulator is arranged prior to the detector in each signal path of the two superposition signals and this optical sine signal mixing can accordingly be realized in integrated optics.

Another preferable construction of the invention which can be realized in integrated optics is a three-arm interferometer in which there are two measuring arms, e.g., to achieve a coupled two-coordinate distance or length measurement. The two measuring arms generate two separately evaluated superposition signals with the same reference arm, wherein a second phase modulator, as mentioned above, is arranged prior to the detector in each signal path of the two superposition signals.

An optical sine signal mixing by means of an electro-optical phase modulator can also easily be changed to an electronic sine signal mixing subsequent to the detector in both design possibilities of three-arm interferometers.

Further, it has proven advantageous to filter one or more signals of different frequencies out of the frequency spectrum of the superposition signal for regulating the control signal of the known phase modulator.

The basic idea of the invention consists in producing a signal structure of the superposition signal from the measuring and reference arm signal by means of a simple sinusoidal control of the known phase modulator, which signal structure can be evaluated in a known manner with respect to the phase displacements in the measuring arm. According to the invention, this is achieved in that a sine signal which is coupled to the sine control of the known phase modulator so as to be stable with respect to phase and frequency is mixed into the superposition signal of the measurement and reference arm, and a signal is filtered out of the frequency spectrum of the mixed signal obtained in this way and analyzed at a filter frequency at which the sum and difference frequencies of two different harmonics of the modulation frequency of the known phase modulator and the mixing frequency of the mixed sine signal are equal. Accordingly, by selecting a suitable operating point of the amplitude of the control signal at the phase modulator, a cosine signal results which can be evaluated in a conventional manner for determining the phase displacement.

Instead of using a complicated sawtooth control with a sine control and a sine signal mixing in the superimposition signal of the interferometer, the phase-modulated interferometer according to the invention makes it possible to arrive at the same signal structure which allows the evaluation of phase displacements and accordingly a desired distance measurement.

The simple sine control for the phase modulator and generation of the mixing signal has the additional advantage that suitable electro-optical modulators can be realized in integrated-optical chips (IOC) and accordingly an integratedoptical phase-modulated interferometer, in particular a heterodyne interferometer, can be produced commercially for various technical applications.

For a better understanding of the present invention, reference is made to the following description and accompanying drawings while the scope of the invention will be pointed out in the appended claims.

BRIEF DESCRIPTION OF THE DRAWINGS

In the drawings:

FIG. 1b illustrates a partial block diagram of a first particular arrangement of FIG. 1a while;

FIG. 1c illustrates a partial block diagram of a second particular embodiment of FIG. 1a;

DESCRIPTION OF THE PREFERRED EMBODIMENTS

Figure 1A:
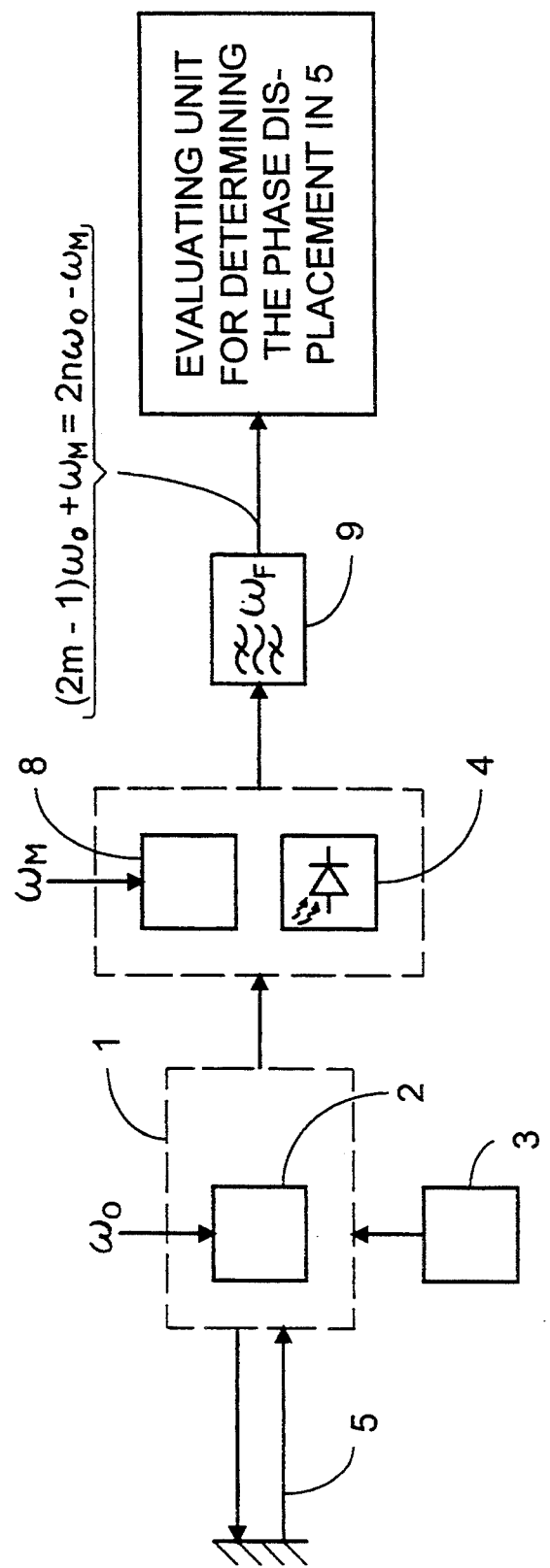
FIG. 1a illustrates a block diagram of the arrangement according to the invention.

As is shown in FIG. 1a, the basic construction of the interferometer according to the invention comprises an interferometer arrangement which is preferably constructed as an integrated-optical chip (IOC 1) and has a phase modulator 2 in one of its interferometer arms (measuring or reference arm). The interferometer arrangement is conventionally coupled with a laser source, preferably in the form of a laser diode 3, and with a detector 4 and a measuring length 5 determining the measuring arm of the interferometer.

The so-called superposition signal is formed from the measuring and reference arm signals and is optically and electronically influenced and processed until analyzed for phase displacement. The opto-electronic conversion in the detector 4 represents a conventional processing step.

According to the invention, the known phase modulator 2 is controlled by a purely sinusoidal control signal at modulation frequency $\omega_0$ and the superposition signal is mixed by means of a device 8 for multiplicative mixing of the superposition signal;with a sine signal with mixing frequency $\omega_M$ which is coupled with the control signal so as to be rigid with respect to phase and frequency. The processing components (detector 4 and device 8) arranged in the signal path of the superposition signal are followed by an electronic bandpass filter 9 which filters out a signal component in a relatively narrow band (adapted to the frequency range of the measuring task), which signal component contains both the sum frequency and the difference frequency from harmonics of the control frequency $\omega_0$ and mixing frequency $\omega_M$ and accordingly has a filter frequency $$\omega_F = (2m-1)\omega_0 + \omega_M = 2n\omega_0 - \omega_M,$$

where m,n = 1, 2, 3 ... and m ≤ n.

In a subsequent evaluating unit for determining the phase displacement within the measuring length 5, a signal having the structure $$S = \text{const.}(\omega_F t - kx),$$

results when the operating point is adjusted in a suitable manner with respect to the amplitudes of the two selected harmonics of the control frequency $\omega_0$, which signal can be evaluated with the usual methods for evaluating phase displacement and where t represents time, k is wave number, and x is the distance to be measured.

The appropriate operating point for simplifying the signal structure indicated above is effected when the following condition is met:

$$J_{2m-1}(2\psi_0) = J_{2n}(2\psi_0),$$

with m,n = 1, 2, 3, ... and m ≤ n, where $J_i$ is the i-th Bessel function and $\psi_0$ is the amplitude of the control signal with the modulation frequency $\omega_0$.

Figure 1B:
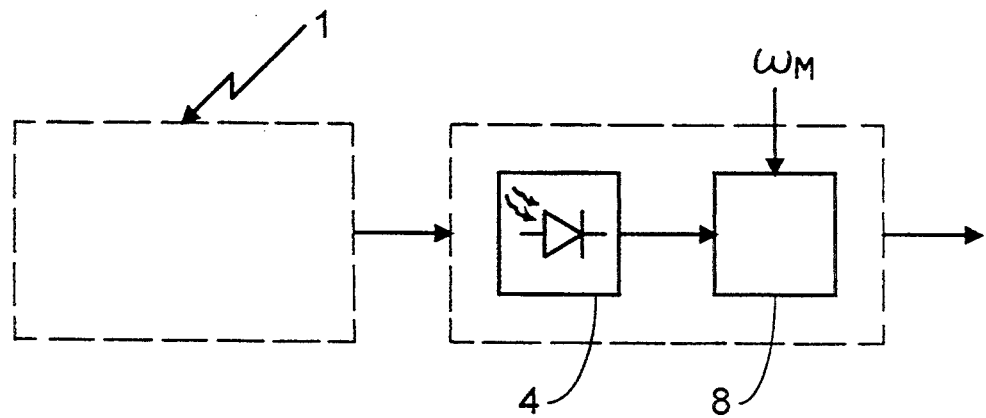
Figure 1C:
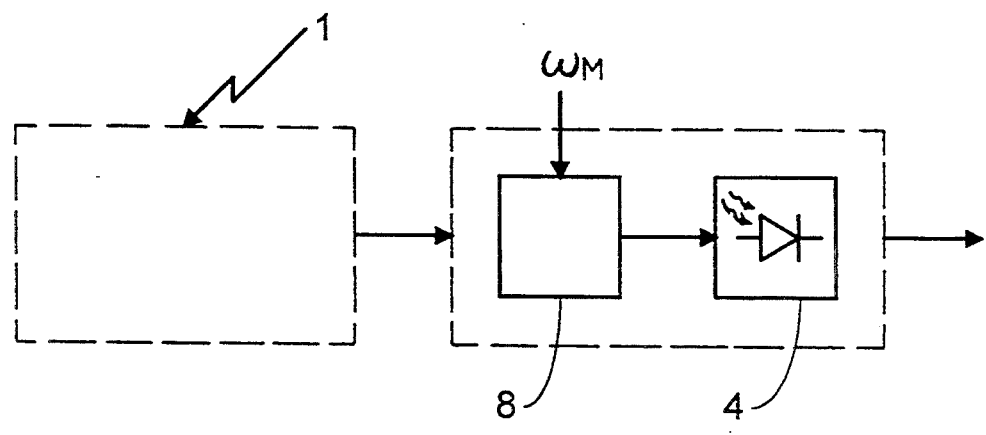

FIG. 1b shows a portion of FIG. 1a with the mixing device 8 following the detector 4; FIG. 1c shows a portion of FIG. 1a with the detector 4 following the mixing device 8.

Figure 2:
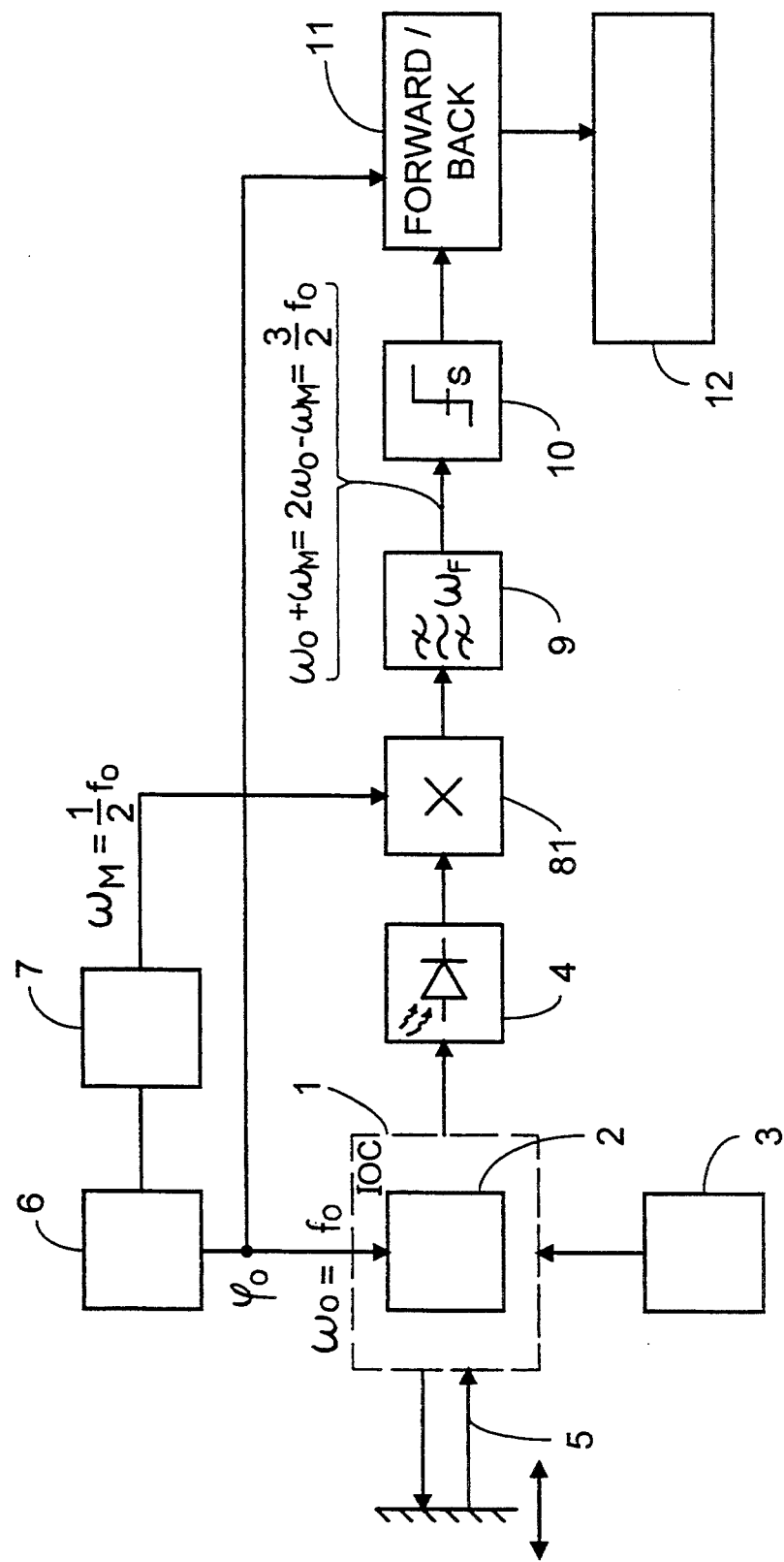
FIG. 2 illustrates an embodiment form with electrical sine signal mixing.

FIG. 2 shows an embodiment form based on the basic principle mentioned above. The control of the phase modulator 2 on the IOC 1 is effected with a sinusoidal signal whose frequency is given by the fundamental or base frequency $f_0$ of a generator 6. The light coming from the laser diode 3, which is preferably fed or coupled in via light-conducting fibers, is brought via the interferometric arrangement of the IOC 1 to the measuring length 5 of the measuring arm and to the phase modulator 2, which is preferably arranged in the reference arm of the interferometer, and finally to the detector 4 as superposition signal from the two interferometer arms. After being transformed into an electric signal, the superposition signal is fed to a multiplier 81 which embodies the device 8 for mixing the superposition signal with a sine signal as electronic construction variant. The signal to be mixed in is fed to the multiplier 81 on its second input by the generator 6 via a frequency divider 7 so as to be halved in this specific example as mixing frequency $\omega_M = \frac{1}{2} f_0$. In order to satisfy the frequency condition for the bandpass filter 9, the sum and difference frequency is to be filtered out with the first and second harmonics of $\omega_0 = f_0$ according to the selection of $\omega_M = \frac{1}{2} f_0$. This occurs when choosing the filter frequency $\omega_F = 3/2 \, f_0$. The two signals with the same frequency and phase at the output of the bandpass filter 9 result in the desired pure cosine signal with a selection of the operating point at the phase modulator 2 at $J_1(2\psi_0) = J_2(2\psi_0)$. This signal, which is subjected to a threshold criterion in a threshold unit 10 and to a direction detection for the phase displacement in a subsequent direction discriminator 11 to which the base frequency $f_0$ of the generator 6 is also applied, is finally processed in an evaluating computer 12 in a conventional manner in order to determine the amount of the phase displacement and the distance difference (distance x) to be measured along the measuring length 5.

Figure 3:
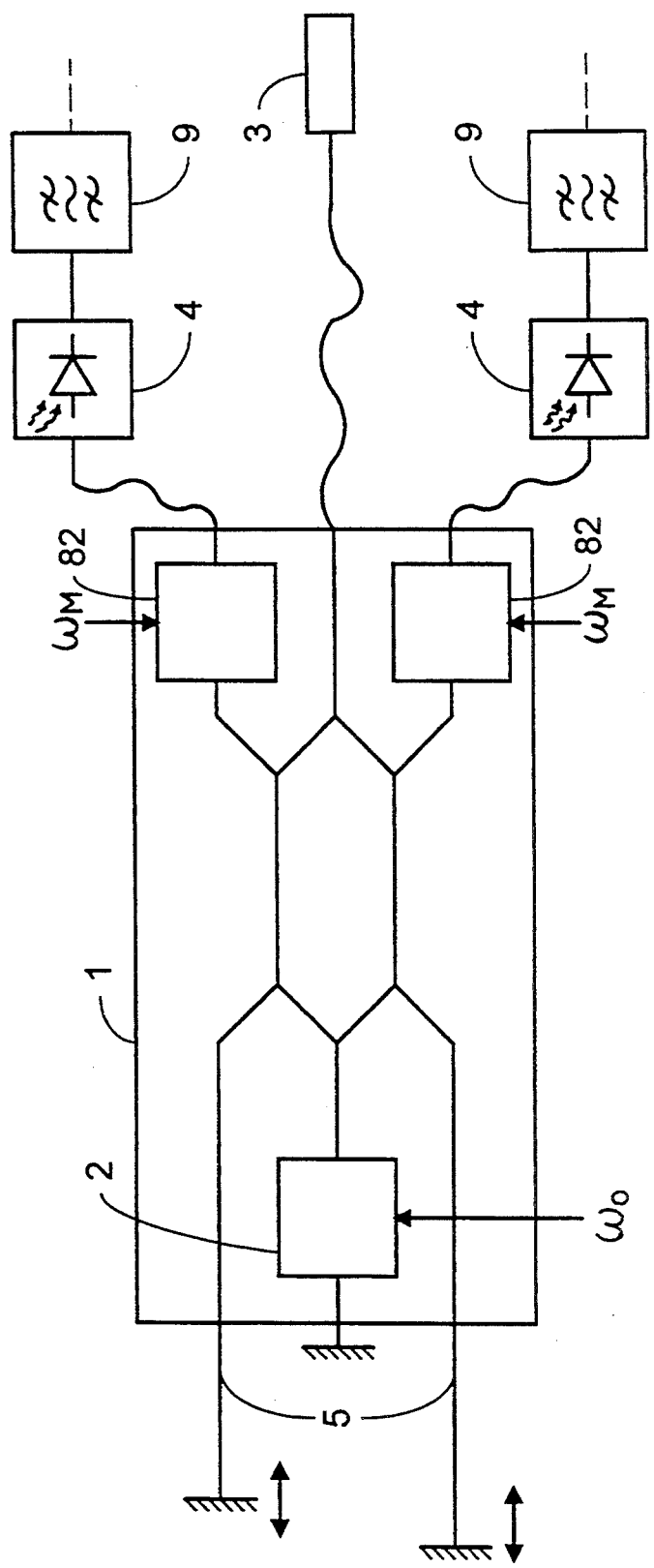
FIG. 3 illustrates a design form as integrated-optical double interferometer with optical sine signal mixing.

The second embodiment example of the invention shown in FIG. 3 includes the view of an integrated optical chip 1 (IOC 1). Further, the possible simple realization of a double interferometer (also three-arm interferometer) with two measuring arms and a reference arm is shown in a stylized manner. However, as concerns the evaluation, the partial interferometer can be considered entirely separately. Their common features consist only in the common use of a laser diode 3, reference arm with phase modulator 2, and strip waveguides produced in a process on the IOC 1. The advantage consists in a homogeneous, compact distance measurement of two independent coordinates.

It is distinguished from the first example in FIG. 2 in that the unit 8 for multiplicative mixing of the superposition signal with a sine signal is realized in a different manner. In this case, the advantageous optical mixing is effected by means of a second phase modulator 82 prior to the detector 4. The second phase modulator 82 is arranged in an integrated-optical manner in the signal path of the superposition signal on the IOC 1, specifically separately for each superposition signal of the partial interferometer. The bandpass filter 9 immediately follows the detector 4 in every evaluating cycle with the general condition indicated above. Attention is again drawn to the frequency-rigid and phase-rigid coupling of the control signals of the phase modulator 2 with the second phase modulators 82, but the generation of that coupling is not shown explicitly in FIG. 3. As in the first example, the frequencies can be selected optionally within the framework of the filter condition by means of a common generator 6 and appropriate frequency dividing as long as the operating point of the control signal can be suitably adjusted.

While the foregoing description and drawings represent the preferred embodiments of the present invention, it will be obvious to those skilled in the art that various changes and modifications may be made therein without departing from the true spirit and scope of the present invention.

What is claimed is:

1. A phase-modulated interferometer comprising:
   a measuring arm;
   a reference arm;
   a phase modulator being arranged in one of said arms for phase modulation of an optical beam;
   a detector for picking up an optical superposition signal from said measuring and reference arm;
   evaluating means being arranged subsequent to the detector for determining the phase displacement of said signal;
   means for applying to the phase modulator a sinusoidal control signal with a modulation frequency ($\omega_0$) and having an amplitude ($\psi_0$);
   means for multiplicative mixing of said superposition signal with a sinusoidal signal with a mixing frequency ($\omega_M$); said means for multiplicative mixing being arranged in a signal path of said superposition signal; said sinusoidal signal with mixing frequency ($\omega_M$) being rigidly coupled with respect to phase and frequency with said control signal; and
   a bandpass filter having an output being arranged subsequent to said detector and having a filter frequency ($\omega_F$) being determined by agreement of the sum frequency and difference frequency of two harmonics of said modulation frequency ($\omega_0$) and mixing frequency ($\omega_M$) at $$\omega_F = (2m-1)\omega_0 + \omega_M = 2n\omega_0 - \omega_M,$$

where $m, n = 1, 2, 3 \ldots$ and $m \leq n$, so that suitable selection of an operating point affected by the amplitude ($\psi_0$) of the control signal at said output of said bandpass filter results in a signal having the following form $$S = \text{const.} \cos(\omega_F t - kx),$$

which signal is evaluated for determining phase displacement, where t designates time, k designates wave number and x designates the distance to be measured.

2. The interferometer according to claim 1, wherein said means for multiplicative mixing of the superposition signal is a multiplier which is arranged between said detector and said bandpass filter, the sinusoidal signal with mixing frequency $\omega_M$ being applied to a second input of said multiplier.

3. The interferometer according to claim 2, wherein the operating point of said control signal at said phase modulator is adjusted so that said amplitude ($\psi_0$) satisfies the equation $$J_{2m-1}(2\psi_0) = J_{2n}(2\psi_0),$$

where $m, n = 1, 2, 3, \ldots$ and $m \leq n$ and $J_i$ is the i-th Bessel function.

4. The interferometer according to claim 1, wherein said means for multiplicative mixing of the superposition signal is a second phase modulator which is arranged in the signal path of the optical superposition signal prior to the detector and is supplied with said sinusoidal signal with mixing frequency $\omega_M$ as control signal.

5. The interferometer according to claim 4, wherein the operating point of the control signal at said second phase modulator is adjusted so that the amplitude ($\psi_0$) satisfies the equation $$J_{2m-1}(2\psi_0) = J_{2n}(2\psi_0),$$

where $m, n = 1, 2, 3, \ldots$ and $m \leq n$, and $J_i$ is the i-th Bessel function.

6. The interferometer according to claim 4, wherein splitting and superposition optical signals and realization electro-optical phase modulators are effected with the use of integrated optics.

7. The interferometer according to claim 1, wherein at least one signal with a frequency different than that of the control signal and a sinusoidal signal with frequency ($\omega_M$) is filtered out of the frequency spectrum of the superposition signal for regulating the control signal.

8. The interferometer of claim 1 wherein said means for multiplicative mixing is arranged prior to said detector.

9. The interferometer of claim 1 wherein said means for multiplicative mixing is arranged following said detector.

10. The interferometer of claim 1 including a threshold unit and direction discriminator for evaluation of the detector signal.

11. A phase-modulated interferometer comprising:
a measuring arm;
a reference arm;
a phase modulator being arranged in one of said arms for phase modulation of an optical beam;
a detector for picking up an optical superposition signal from said measuring and reference arm;
evaluating means being arranged subsequent to the detector for determining the phase displacement of said signal;
means for applying to the phase modulator a sinusoidal control signal with a modulation frequency ($\omega_0$) and having an amplitude ($\psi_0$);
means for multiplicative mixing of said superposition signal with a sinusoidal signal with a mixing frequency ($\omega_M$); said means for multiplicative mixing being arranged in a signal path of said superposition signal; said sinusoidal signal with mixing frequency ($\omega_M$) being rigidly coupled with respect to phase and frequency with said control signal; and
a bandpass filter having an output being arranged subsequent to said detector and having a filter frequency ($\omega_F$) being determined by agreement of the sum frequency and difference frequency of two harmonics of said modulation frequency ($\omega_0$) and mixing frequency ($\omega_M$) at $$\omega_F = (2m-1)\omega_0 + \omega_M = 2n\omega_0 - \omega_M,$$

where m,n = 1, 2, 3 ... and m $\leq$ n, so that suitable selection of an operating point affected by the amplitude ($\psi_0$) of the control signal at said output of said bandpass filter results in a signal having the following form $$S = \text{const.}\cos(\omega_F t - kx),$$

which signal is evaluated for determining phase displacement, where t designates time, k designates wave number and designates the distance to be measured; and
wherein said means for multiplicative mixing of the superposition signal is a second phase modulator which is arranged in the signal path of the optical superposition signal prior to the detector and is supplied with said sinusoidal signal with mixing frequency $\omega_M$ as control signal, comprising three-arms, two reference arms being provided to compensate for the wavelength drifts of a laser diode, said two reference arms generating two separately evaluated superposition signals with a same measuring arm and second phase modulator being arranged prior to the detector in each signal path of the two superposition signals.

12. A phase-modulated interferometer comprising:
a measuring arm;
a reference arm;
a phase modulator being arranged in one of said arms for phase modulation of an optical beam;
a detector for picking up an optical superposition signal from said measuring and reference arm;
evaluating means being arranged subsequent to the detector for determining the phase displacement of said signal;
means for applying to the phase modulator a sinusoidal control signal with a modulation frequency ($\omega_0$) and having an amplitude ($\psi_0$);
means for multiplicative mixing of said superposition signal with a sinusoidal signal with a mixing frequency ($\omega_M$); said means for multiplicative mixing being arranged in a signal path of said superposition signal; said sinusoidal signal with mixing frequency ($\omega_M$) being rigidly coupled with respect to phase and frequency with said control signal; and
a bandpass filter having an output being arranged subsequent to said detector and having a filter frequency ($\omega_F$) being determined by agreement of the sum frequency and difference frequency of two harmonics of said modulation frequency ($\omega_0$) and mixing frequency ($\omega_M$) at $$\omega_F = (2m-1)\omega_0 + \omega_M = 2n\omega_0 - \omega_M,$$

where m,n = 1, 2, 3 ... and m $\leq$ n, so that suitable selection of an operating point affected by the amplitude ($\psi_0$) of the control signal at said output of said bandpass filter results in a signal having the following form $$S = \text{const.}\cos(\omega_F t - kx),$$

which signal is evaluated for determining phase displacement, where t designates time, k designates wave number and x designates the distance to be measured; and
wherein said means for multiplicative mixing of the superposition signal is a second phase modulator which is arranged in the signal path of the optical superposition signal prior to the detector and is supplied with said sinusoidal signal with mixing frequency $\omega_M$ as control signal,
comprising three-arms, two measuring arms being provided for achieving a two-coordinate length measurement, said two measuring arms generating two separately evaluated superposition signals with a same reference arm and a second phase modulator being arranged prior to the detector in each signal path of the two superposition signals.

13. A method for mixing signals in a phase-modulated interferometer using a known phase modulator having a sine control comprising the steps of:
mixing a sine signal, which is coupled to the sine control of said known phase modulator so as to be stable with respect to phase and frequency, with a superposition signal of measurement and reference arms of said interferometer to obtain a mixed signal frequency spectrum;
filtering a signal out of said mixed frequency spectrum at a filter frequency at which the sum and difference frequencies of two different harmonics of the modulation frequency of the known phase modulator and the mixing frequency of the mixed sine signal are equal; and
analyzing said filtered signal at said filter frequency.

* * * * *